Figures 1, 2:
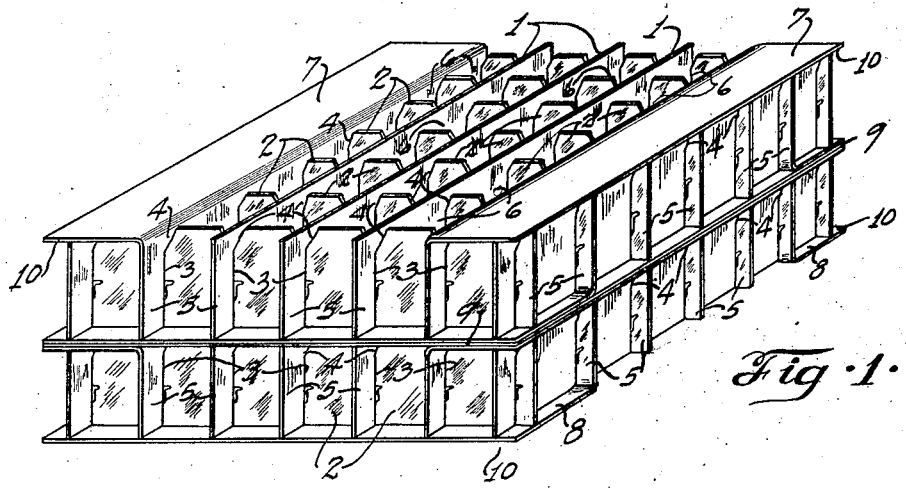

March 4, 1924.

B. A. LANGE

EGG CASE

Filed Nov. 24, 1922

1,486,025

INVENTOR:
B. A. Lange,
By Hugh K. Wagner
ATTORNEY.

Patented Mar. 4, 1924.

1,486,025

UNITED STATES PATENT OFFICE.

BERTHOLD A. LANGE, OF ST. LOUIS, MISSOURI.

EGG CASE.

Application filed November 24, 1922. Serial No. 602,973.

*To all whom it may concern:*

Be it known that I, BERTHOLD A. LANGE, a citizen of the United States, residing at the city of St. Louis, in the State of Missouri, have invented certain new and useful Improvements in Egg Cases, of which the following is a specification.

The transportation of eggs is one of the largest and most difficult phases of commerce. The value of the egg and its fragility combine to make any saving of breakage of extreme economic importance. Many kinds of egg-cases or fillers have been tried, but all possess some defect or another. The construction herein shown and described is one of the best for protecting the eggs from breakage, and the specific object of this invention is to provide an egg-case or filler which is less flimsy and to stiffen or stabilize the same.

In the accompanying drawings forming part of this specification, in which like numbers of reference denote like parts wherever they occur, Figure 1 is a perspective view of a tier composed of two of these devices; and Figure 2 is a perspective view of a modification or alternative form.

The crate filler or egg case is composed of a plurality of interlocking partitions 1 and 2 arranged at substantially a right angle to each other and fastened together by any suitable locking means at the points where they pass or join each other. This may be accomplished by slits 3 in partitions 1, allowing partitions 1 to fit down in notches 4 in partitions 2. Otherwise stated, the partitions 1 and 2 are each slit and turned in opposite directions, so that each fits in the slit in the other.

Projections 5 prevent the transmission of shock or jar or slippage to the eggs inserted in the compartments 6, acting as a buffer and preventing telescoping. When the said extensions or projections 5 are bent or broken the egg breakage is greatly increased. The same should, therefore, preferably be protected by overlying flanges 7, which terminate flush with the outer edges of the said projections 5. The flanges or edges 7 may be formed as integral extensions from any one of the intermediate partitions 1 or from the next-to-the-end partition 1, as shown in Figure 1, or the end partition 1, as shown in Figure 2.

The construction so far described has nevertheless been found to be flimsy and to require additional stiffening. This is accomplished by the arrangement of the transverse member 8, which is arranged at substantially a right angle to the flanges 7 and may be attached either to the end or the next-to-the-end partition 2 or any other of the partitions 2. The flanges 7 and 8 will be preferably formed integral with the partitions 1 or 2 from which they spring, but may be otherwise attached thereto.

While the flanges 7 stiffen the crate in one direction they are entirely inadequate for stiffening the same in a practical manner, because they do not impart the desired stability by themselves. They leave the crate in a distinctly collapsible condition, which is very detrimental in egg shipments. It is only by the introduction of the flange or stiffener 8 running crosswise relatively to the flanges 7 that the crate assumes the desired and necessary firmness and stiffness. With only the flanges 7, and under the vicissitudes of transportation, the eggs will be broken by the shifting in shape of the crate. With the addition of the flange 8, however, and the bearing down of weight upon flange 8, considerable rigidity is imparted to the structure as a whole, with the result that it becomes practically immovable.

Preferably there will be a flange 8 at each end or side of the filler and preferably there will be, also, a flange 7 at each side or end of the crate, the said flanges 7 running at substantially a right angle to the direction of the flange 8.

A diaphragm 9 is commonly used between tiers of egg-crates, but works loose and shifts its position. The present structure obviates the necessity of using such a diaphragm.

The stiffening strip or flange 8 preferably underlies the projections 5 of partitions 2, as at 10, and is preferably located on the reverse side of the filler from the flange 7.

This case or crate filler is adapted to be collapsed for shipment or reshipment and thus to occupy very little space; but when filled with eggs in its pockets or cells the stiffening strips maintain it in a condition not readily to be collapsed or caused to yield or bend under ordinary pressure.

The stiffening strips or flanges may be on either the top or the bottom of the egg-case or partially on top and partially on the bottom as shown.

Having thus described this invention, I hereby reserve the benefit of all changes in form, arrangement, order, or use of parts, as it is evident that many minor changes may be made therein without departing from the spirit of this invention or the scope of the following claim.

I claim:

A cellular filler or case for egg crates comprising a plurality of intersecting strips of material spaced from each other to provide a series of egg-cells, predetermined strips adjacent the end walls of said filler being equipped with integral extensions on one longitudinal edge bent at right angles to form parallel pairs of reinforcing flanges, the latter covering the outer rows of cells and projections of said strips, and one pair of flanges being on top of the filler and the other pair on the underside thereof, and said pairs being disposed at right angles to each other.

In testimony whereof I hereunto affix my signature.

BERTHOLD A. LANGE.